United States Patent [19]

Butz

[11] 4,429,448

[45] Feb. 7, 1984

[54] MOUNTING DEVICE FOR A BICYCLE HUB

[75] Inventor: Hans Butz, Schwebheim, Fed. Rep. of Germany

[73] Assignee: Fichtel & Sachs AG, Schweinfurt, Fed. Rep. of Germany

[21] Appl. No.: 321,524

[22] Filed: Nov. 16, 1981

[30] Foreign Application Priority Data

Nov. 28, 1980 [DE] Fed. Rep. of Germany ... 8031759[U]

[51] Int. Cl.³ ............................................ B25B 27/14
[52] U.S. Cl. .................................................... 29/281.5
[58] Field of Search .............................. 29/281.1–283, 29/228, 229, 243.5, 243.52, 271–274; 269/47–52

[56] References Cited

U.S. PATENT DOCUMENTS

| | | | |
|---|---|---|---|
| 2,340,986 | 2/1944 | Roberts et al. | 29/273 |
| 3,383,067 | 5/1968 | Uritis | 269/48.1 |
| 3,479,722 | 11/1969 | Maness | 29/280 |
| 3,672,023 | 6/1972 | McCombs | 29/281.5 |
| 3,737,973 | 6/1973 | Stawski | 29/235 |
| 3,862,487 | 1/1975 | Van Gundy | 269/47 |
| 4,102,215 | 7/1978 | Nagano et al. | |
| 4,330,917 | 5/1982 | Dzurkovich | 29/235 |

Primary Examiner—Robert C. Watson
Attorney, Agent, or Firm—Toren, McGeady and Stanger

[57] ABSTRACT

A drive hub for a bicycle has a driving member with a plurality of annular members positioned on an outer peripheral face of the driving member. A mounting sleeve is used for facilitating the assembling of the hub. This mounting sleeve is provided on its outer peripheral face with an angular positioning profile substantially identical with the torque transmitting profile of the driving member. First and second axial abutment members are provided on the outer peripheral face of the mounting sleeve adjacent a first and a second axial end of the mounting sleeve. Centering tongues and counter centering grooves are provided on one axial end of the mounting sleeve and on the driving member, respectively. When these centering elements are brought into engagement, the angular positioning profile of the mounting sleeve is both in axial and angular alignment with the torque transmitting profile of the driving member. So the annular members which have been preassembled before on the mounting sleeve between the first and the second abutment members may be axially slid onto the driving member while the first abutment members are deflected by the annular members sliding from the mounting sleeve onto said driving member.

22 Claims, 3 Drawing Figures

U.S. Patent      Feb. 7, 1984      4,429,448
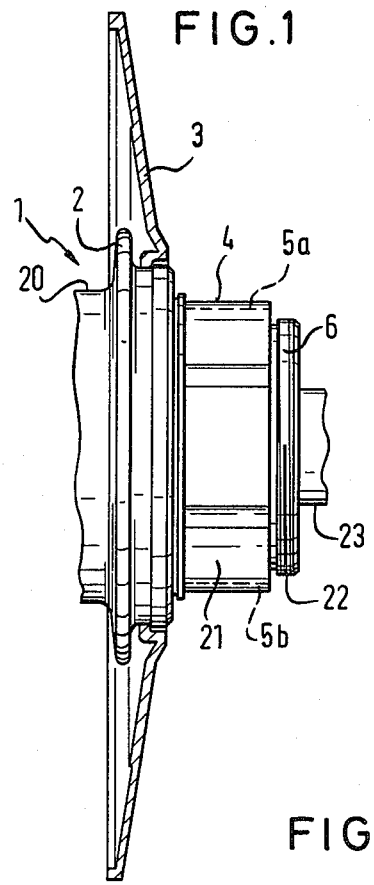
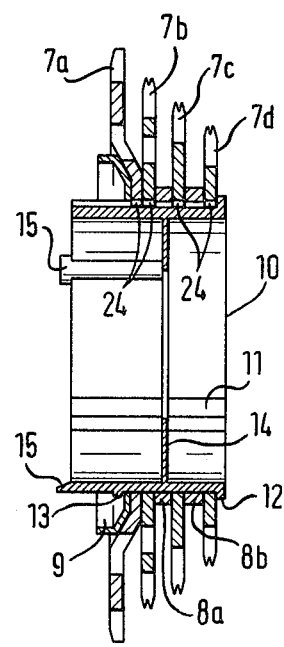
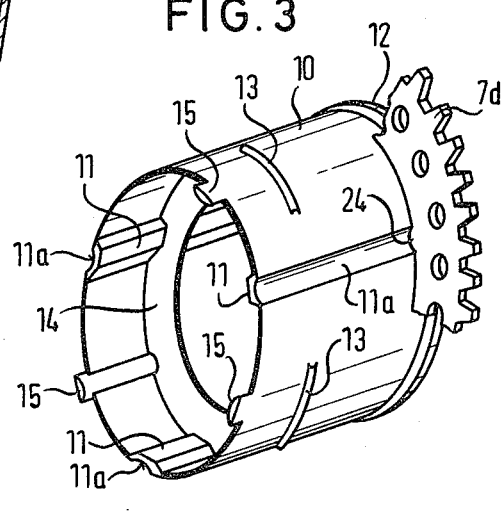

MOUNTING DEVICE FOR A BICYCLE HUB

SUMMARY OF THE INVENTION

The present invention is directed to a mounting device for facilitating the assembling of a bicycle hub.

A bicycle hub comprises a driving member, the axial length of which extends at least partly beyond one axial end of a hub sleeve. The axial section of this driving member which extends beyond the respective end of the hub sleeve is provided with an outer peripheral face. This outer peripheral face defines a torque transmitting profile. On this outer peripheral face there are mounted a plurality of annular members. In cases in which this bicycle hub is to be combined with a chain-shifting unit these annular members comprise at least two chain wheels. Between subsequent chain wheels there may be provided washers for defining a predetermined distance between said subsequent chain wheels. Further, there may be provided on said outer peripheral face a cover member for covering the internal chamber of the hub sleeve in which various gear components may be housed. These annular members must be mounted on the driving member. In the mounting operation one must observe a predetermined angular position of at least part of the angular members with respect to the torque transmitting profile of the driving member of the bicycle hub so that these annular members can engage with a counter profile provided at their respective inner axes the torque transmitting profile of the driving member. This is particularly true for the chain wheels, which are to transmit a driving torque from the bicycle chain to the respective bicycle wheel. Mounting of the annular members onto the driving member is therefore troublesome and time-consuming. This is particularly true for bicycle dealers, who have to mount the annular members onto the driving member when assembling a bicycle wheel. There is also the risk that the annular members are not correctly positioned on the driving member.

It is an object of this invention to provide a mounting device which facilitates the mounting of a group of annular members onto a driving member of a bicycle hub.

A further object of the invention is to permit preassembling of a group of annular members in the correct relative position, for example, by the hub manufacturer so that the bicycle dealer can mount the group of annular members as an entirety to the driving member without changing the relative position of the individual annular members.

In accordance with the present invention the mounting device comprises a mounting sleeve having an outer peripheral face defining an angular positioning profile substantially identical with said torque transmitting profile of said driving member. First and second axial abutment means are provided on the outer peripheral face of the mounting sleeve adjacent a first and a second axial end of said mounting sleeve respectively. "Adjacent" means that said first abutment means is nearer to said first axial end and said second abutment means is nearer to said second axial end. The abutment means may have axial distances from the respective ends. The mounting sleeve is further provided with centering means adjacent said first axial end thereof for engagement with counter centering means provided on said driving member. When said centering means are brought into engagement with said counter centering means, said angular positioning profile of said mounting sleeve is in axial and angular alignment with said torque transmitting profile of said driving member. The first abutment means are deflectable such that said annular members which have been pre-assembled before on the mounting sleeve between said first and second abutment means may be axially slid beyond said first abutment means onto said driving member when said centering means are in engagement with said counter centering means.

The torque transmitting profile on the drive member may comprise at least one axially extending torque transmitting groove in the outer peripheral face of the driving member. Accordingly, the angular positioning profile on said mounting sleeve may comprise at least one angular positioning groove in the outer peripheral face of said mounting sleeve. In practice, it is preferred to provide a plurality of for example three torque transmitting grooves in said outer peripheral face of said driving member; in this case, an equal member of angular positioning groups may be provided in the outer peripheral face of the mounting sleeve the axial distances of the torque transmitting grooves and the angular positioning grooves being also equal. For engagement with the torque transmitting grooves and the angular positioning grooves, respectively, the counter profile of the respective annular member may comprise at least one radially inwardly directed projection at the radially inner edge of the respective annular member; when a plurality of grooves are provided on the driving member and on the mounting sleeve an equal plurality of projections may be provided at the radially inner edge of the annular members.

The centering means may comprise at least two centering tongues axially projecting beyond said first axial end of said mounting sleeve. Under these circumstances, the counter centering means may comprise corresponding centering recesses in said driving member. Preferably, these centering recesses are defined by axially extending centering grooves in the outer peripheral face of the driving member. The centering grooves may be identical in cross section with the torque transmitting grooves of said driving member in view of facilitating manufacturing of the driving member. The centering grooves and the torque transmitting grooves may be distributed about the axis of the driving member with equal angular distances between subsequent grooves in order to avoid localized weakening of the driving member.

The first abutment means may be defined by at least one circumferentially extending bead on the outer peripheral face of the mounting sleeve; this bead may extend continuously around the total periphery of the mounting sleeve or may be divided into a plurality of bead segments which are distributed around the periphery of the mounting sleeve. The mounting sleeve may be manufactured of plastic material such as polyethylene. In this case, the abutment means may be made integral with the mounting sleeve and the deflection may occur due to elastic or plastic deformation of the abutment means.

With certain types of bicycle hubs the driving member is provided with an externally threaded extension of reduced diameter, this extension being intended for receiving a fastening nut for fastening said annular members on said driving member in axial direction. The fastening nut may be part of one or two additional chain wheels. Under such circumstances the centering means may comprise internal centering ribs provided on the inner peripheral face of the mounting sleeve, said centering ribs being intended for engagement with said externally threaded extension of reduced diameter of the driving member. These centering ribs may be defined by axially extending radially inwardly directed depressions of said mounting sleeve which depressions define angular positioning grooves in said outer peripheral face of the mounting sleeve.

The invention further proposes a mounting unit for mounting a plurality of annular members onto a driving member of a drive hub of a bicycle or the like. This mounting unit comprises a mounting sleeve as defined above. The annular members surround said mounting sleeve and are axially positioned between said first and said second abutment means of said mounting sleeve. At least part of said annular members are provided with a counter profile at the radially inner edge thereof, said counter profile being engaged with said angular positioning profile of said mounting sleeve.

The various features of novelty which characterize the invention are pointed out with particularity in the claims annexed to and forming a part of the disclosure. For a better understanding of the invention, its operating advantages and specific objects attained by its use, reference should be made to the accompanying drawings and descriptive matter in which there are illustrated and described preferred embodiments of the invention.

BRIEF DESCRIPTION OF THE DRAWING

In the drawing:

FIG. 1 is a partial view of a bicycle hub showing one axial end of the bicycle hub including the outer peripheral face of the driving member;

FIG. 2 is a sectional view of a mounting sleeve with a plurality of annular members assembled thereon; and FIG. 3 is a perspective view of the mounting sleeve as shown in FIG. 2.

DETAILED DESCRIPTION OF THE INVENTION

In FIG. 1 there is shown one axial end of a drive hub 1, with a hub sleeve 20 and a spoke flange 2. A spoke protection disk 3 is mounted on the hub sleeve 20. A drive member 4 extends axially beyond the right hand end of the hub sleeve 20. This drive member is part of a hub gear which may be housed within the hub sleeve 20 and/or within a central bore of the drive member 4. Details of the hub gear are shown for example in the co-pending patent application Ser. No. 190,810 of the assignee filed Sept. 23, 1980 now U.S. Pat. No. 4,400,999. The drive member 4 has an outer peripheral face 21. In this outer peripheral face 21 there are provided a plurality of axially extending grooves 5a and 5b. The driving member 4 comprises an extension 6 of reduced diameter which extension 6 is provided with an external thread 22 on its outer peripheral face. The driving member 4 surrounds the stationary hub shaft 23 and is rotatable about this hub shaft.

A group of annular members is to be mounted onto the outer peripheral face 21 of the drive member 4 for completing the bicycle hub. This group of annular members is shown in FIG. 2. It comprises an annular cover member 9, and four chain wheels 7a to 7d. Washers 8a and 8b are provided between the chain wheels 7b and 7c and the chain wheels 7c and 7d, respectively.

The chain wheels 7a–7d are provided at their radially inner edge with radially inwardly directed projections 24. Each chain wheel 7a to 7d is provided with three radially inwardly directed projections 24 which are distributed around the inner edge in respective angular distances of 120°. Correspondingly, three axially extending torque transmitting grooves 5a are provided on the outer peripheral face 21 of the drive member 4 but, these torque transmitting grooves 5a also having an angular distance of 120° from each other. When the annular members 7a to 7d, 8a, 8b and 9 are mounted on the drive member 4, the projections 24 of the chain wheels 7a to 7d engage into the torque transmitting grooves 5a of the drive member 4. So, a torque may be transmitted from a chain (non-illustrated) to the drive member 4 through the chain wheels 7a–7d. After the annular members 7a–7d, 8a, 8b and 9 have been mounted onto the drive member 4, a nut is screwed onto the externally threaded extension 6. This nut may be part of one or two additional chain wheels.

In FIG. 2 the annular members 7a–7d, 8a, 8b and 9 are preassembled on a mounting sleeve 10 which is shown in more detail in FIG. 3. The mounting sleeve 10 is made of plastic material, for example polyethylene. The mounting sleeve 10 is provided with three radially inwardly directed depressions 11 which have an angular distance of 120°. These depressions 11 define a corresponding number of axially extending angular positioning grooves 11a. Further the mounting sleeve 10 is provided at its left hand end with three centering tongues 15 which have an angular distance of 120° between each other and have an angular distance of 60° from adjacent depressions 11. The centering tongues 15 are intended for engagement with three accordingly distributed grooves 5b provided in the outer periphery 21 of the driving member 4. A reinforcing ring 14 is provided at the inner periphery of the mounting sleeve 10 and integral therewith. The outer diameter of the mounting sleeve 10 corresponds to the diameter of the outer peripheral face 21. The inner diameter of the mounting sleeve 10 as defined by the radially inwardly directed faces of the depressions 11 corresponds to the outer diameter of the extension 6. The mounting sleeve 10 is provided with an abutment flange 12 and with abutment beads 13.

In the pre-assembled unit as shown in FIG. 2, the annular members 7a–7d, 8a, 8b and 9 having an inner diameter substantially equal to the outer diameter of the mounting sleeve 10 are pre-assembled on the mounting sleeve 10. The radially inward projections 24 engage said centering grooves 11a. The chain wheel 7d is in axial engagement with the abutment flange 12 whereas the annular cover member 9 is in engagement with the bead segments 13.

For mounting the annular members 7a–7d, 8a, 8b and 9 onto the driving member 4, the centering tongues 15 are brought into engagement with the centering grooves 5b of the driving member 4. As a result thereof, the angular positioning grooves 11a of the mounting sleeve 10 are brought into alignment with the torque transmitting grooves 5a of the driving member 4. The mounting sleeve 10 adheres to the driving member 4 by frictional engagement of the centering tongues 15 into the centering grooves 5b. Now, annular members 7a–7d can be slid individually or as a stack beyond the bead segments 13 onto the outer peripheral face 21 of the driving member 4. The radially inward projections 24 enter into the torque transmitting grooves 5a of the driving member 4. The bead segments 13 are of such a configuration that they retain the annular members on the mounting sleeve as long as no considerable force is applied to the annular members; on the other hand, the bead segments 13 are easily deformable so that the annular members 7a–7d, 8a, 8b and 9 can easily slide beyond the bead segments when an axial force is applied to the annular members.

The mounting sleeve 10 may hereupon be removed from the driving member 4 and may be reused. The above-mentioned non-illustrated nut is screwed onto the externally threaded extension 6 so that the annular members 7a–7d, 8a, 8b and 9 are also axially fixed on the driving member 4.

The inner diameter of the ring 14 is greater than the outer diameter of the hub shaft 23.

While a specific embodiment of the invention has been shown and described in detail to illustrate the application of the invented principle, it will be understood that the invention may be embodied otherwise without departing from such principles.

What is claimed is:

1. A mounting device for use in mounting a plurality of annular members such as chain wheels onto a driving member of a drive hub of a bicycle and the like, comprising an axially extending mounting sleeve having a first axial end, a second axial end and an outer and an inner circumferentially extending peripheral face located between said first and second ends, means arranged on said mounting sleeve for effecting centering of said sleeve relative to a drive hub and means for effecting angular positioning of annular members on said sleeve and means for alignment corresponding to a torque transmitting profile on the drive hub, first axial abutment means provided on said outer peripheral face at said mounting sleeve adjacent the first axial end of said mounting sleeve and a second axial abutment means provided on said outer peripheral face of said mounting sleeve adjacent the second axial end of said mounting sleeve, said first abutment means being deflectable so that members temporarily pre-assembled on said outer peripheral face of said mounting sleeve between said first and second abutment means may be axially slid over said first abutment means onto a drive hub when said means for centering align said mounting sleeve relative to the drive hub.

2. A mounting device, as set forth in claim 1, wherein said means on said mounting sleeve for effecting angular positioning comprises at least one angular positioning groove extending axially in the outer peripheral face of said mounting sleeve for angularly positioning members temporarily pre-assembled on said mounting sleeve.

3. A mounting device, as set forth in claim 2, wherein said means for centering comprises at least two centering tongues axially projecting beyond said first axial end of said mounting sleeve and spaced angularly apart around said outer peripheral face.

4. A mounting device, as set forth in claim 1, wherein said first abutment means are defined by at least one circumferentially extending bead on said outer peripheral face of said mounting sleeve.

5. A mounting device, as set forth in claim 4, wherein said bead extends continuously around the full circumferential extent of said mounting sleeve.

6. A mounting device, as set forth in claim 4, wherein said first abutment means are defined by a plurality of circumferentially extending bead segments distributed around and spaced circumferentially apart on said outer peripheral face of said mounting sleeve.

7. A mounting device, as set forth in claim 1, wherein said means for centering comprise axially extending centering ribs provided on the inner circumferentially extending peripheral face of said mounting sleeve, said centering ribs project axially outwardly from the first axial end of said mounting sleeve for engagement with the driving member of a drive hub.

8. A mounting device, as set forth in claim 7, wherein said means for angular positioning comprise a plurality of axially extending angularly spaced radially inwardly directed depressions in the outer peripheral face of said mounting sleeve, and said depressions define angular positioning grooves in said outer peripheral face of said mounting sleeve.

9. A mounting device, as set forth in claim 8, wherein said inwardly directed depressions form centering ribs in the inner peripheral face of said mounting sleeve.

10. A mounting unit comprising a mounting device and a plurality of annular members positioned on said mounting device for transfer therefrom onto a driving member of a drive hub on a bicycle and the like, said mounting device comprising an axially extending mounting sleeve having a first axial end, a second axial end and an outer and an inner circumferentially extending peripheral face located between said first and second axial ends, angular positioning means arranged on said outer peripheral face to correspond substantially to a torque transmitting profile on the driving member of a drive hub, first axial abutment means provided on said outer peripheral face of said mounting sleeve adjacent the first axial end of said mounting sleeve and a second axial abutment means provided on said outer peripheral face of said mounting sleeve adjacent the second axial end of said mounting sleeve, centering means on said mounting sleeve adjacent said first axial end thereof for centering said mounting sleeve relative to the driving member, said annular members extend around said outer peripheral face of said mounting sleeve and are spaced on following the other in the axial direction between said first and second abutment means, means on said annular members for engagement with said angular positioning means on said mounting sleeve, said first abutment means being deflectable such that said annular members, temporarily assembled on said mounting sleeve between said first and second abutment means, can be axially slid beyond said first abutment means onto a driving member when said centering means on said mounting sleeve are in engagement with the driving member.

11. A mounting assembly, as set forth in claim 9, wherein each said annular member has a radially inner circumferentially extending surface in contact with the outer peripheral face of said mounting sleeve, and said means on said annular members comprises a projection extending radially inwardly from the inner circumferentially extending surface on each said annular member and disposed in engagement with said angular positioning means on said mounting sleeve.

12. A mounting assembly for a bicycle and similar vehicle comprising a drive hub including a driving member, a mounting unit comprising a mounting device and a plurality of annular members positioned on said mounting device for transfer therefrom onto said driving member said driving member, has an axially and circumferentially extending outer peripheral face, said outer face of said driving member having means thereon for providing torque transmission, said mounting device comprising an axially extending mounting sleeve having a first axial end, a second axial end and an outer and an inner circumferentially extending peripheral face located between said first and second axial ends, angular positioning means arranged on said outer peripheral face to correspond substantially to said torque transmitting means on said driving member, first axial abutment means provided on said peripheral face of said mounting sleeve adjacent the first axial end of said mounting sleeve and a second axial abutment means provided on said outer peripheral face of said mounting sleeve adjacent the second axial end of said mounting sleeve, centering means on said mounting sleeve adjacent said first axial end thereof for centering said mounting sleeve relative to said driving member, said annular members extend around said outer peripheral face of said mounting sleeve and are spaced one following the other in the axial direction between said first and second abutment means, means on said annular members for engagement with said angular positioning means on said mounting sleeve, counter-centering means formed on said driving member arranged to be aligned with and engage said centering means on said mounting device, said torque transmitting means on said driving member are arranged to align with said angular positioning means on said mounting device when said mounting device is centered by said centering means thereon relative to the countercentering means on said driving member, said first abutment means being deflectable such that said annular members, temporarily assembled on said mounting sleeve between said first and second abutment means, can be axially slid beyond said first abutment means onto said driving member when said centering means on said mounting sleeve are in engagement with said countercentering means on said driving member and said angular positioning means on said mounting sleeve are in alignment with said angular positioning means on said driving member.

13. A mounting assembly, as set forth in claim 12, wherein said centering means on said mounting sleeve comprises at least two centering tongues axially projecting beyond said first axial end of said mounting sleeve and said countercentering means on said driving member comprises at least two corresponding centering recesses in said driving member arranged to receive said centering tongues for aligning said mounting sleeve with said driving member.

14. A mounting assembly, as set forth in claim 13, wherein said centering recesses in said driving member are defined by axially extending centering grooves in the outer peripheral face of said driving member.

15. A mounting assembly, as set forth in claim 14, wherein said torque transmitting means on said driving member comprising axially extending torque transmitting grooves in said outer peripheral face of said driving member, said centering grooves in said driving member are substantially identical in cross-section with said torque transmitting grooves in said driving member.

16. A mounting assembly, as set forth in claim 15, wherein an equal member of said centering grooves and torque transmitting grooves are formed in said driving member and said centering grooves and said torque transmitting grooves are arranged in an alternating manner and are equiangularly spaced apart around the outer peripheral face of said driving member.

17. A mounting assembly, as set forth in claim 12, wherein said first abutment means are defined by at least one circumferentially extending bead on said outer peripheral face of said mounting sleeve.

18. A mounting assembly, as set forth in claim 17, wherein said bead extends continuously around the full circumferential extent of said mounting sleeve.

19. A mounting assembly, as set forth in claim 18, wherein said at least one circumferentially extending bead comprises a plurality of circumferentially extending bead segments distributed in circumferentially spaced relation on said outer peripheral face of said mounting sleeve.

20. A mounting assembly, as set forth in claim 12, wherein said angular positioning means on said mounting sleeve comprises radially inwardly directed depressions in said outer peripheral face of said mounting sleeve and said depressions extend in the axial direction of said mounting sleeve and form angular positioning grooves spaced equiangularly apart around the outer peripheral face from said centering ribs.

21. A mounting assembly, as set forth in claim 20, wherein said inwardly directed depressions on said mounting sleeve comprise internal centering ribs provided on the inner peripheral face of said mounting sleeve, said driving member having a reduced diameter extension extending axially outwardly therefrom, and said internal centering ribs are arranged to contact the outer periphery of said extension on said driving member.

22. A mounting assembly, as set forth in claim 20, wherein each said annular member has a radially inner circumferentially extending surface in contact with the outer peripheral face of said mounting sleeve, and said means on said annular members comprise a projection extending radially inwardly from the inner circumferentially extending surface on each said annular member into engagement with one of said angular positioning grooves in said mounting sleeve.

* * * * *